UNITED STATES PATENT OFFICE.

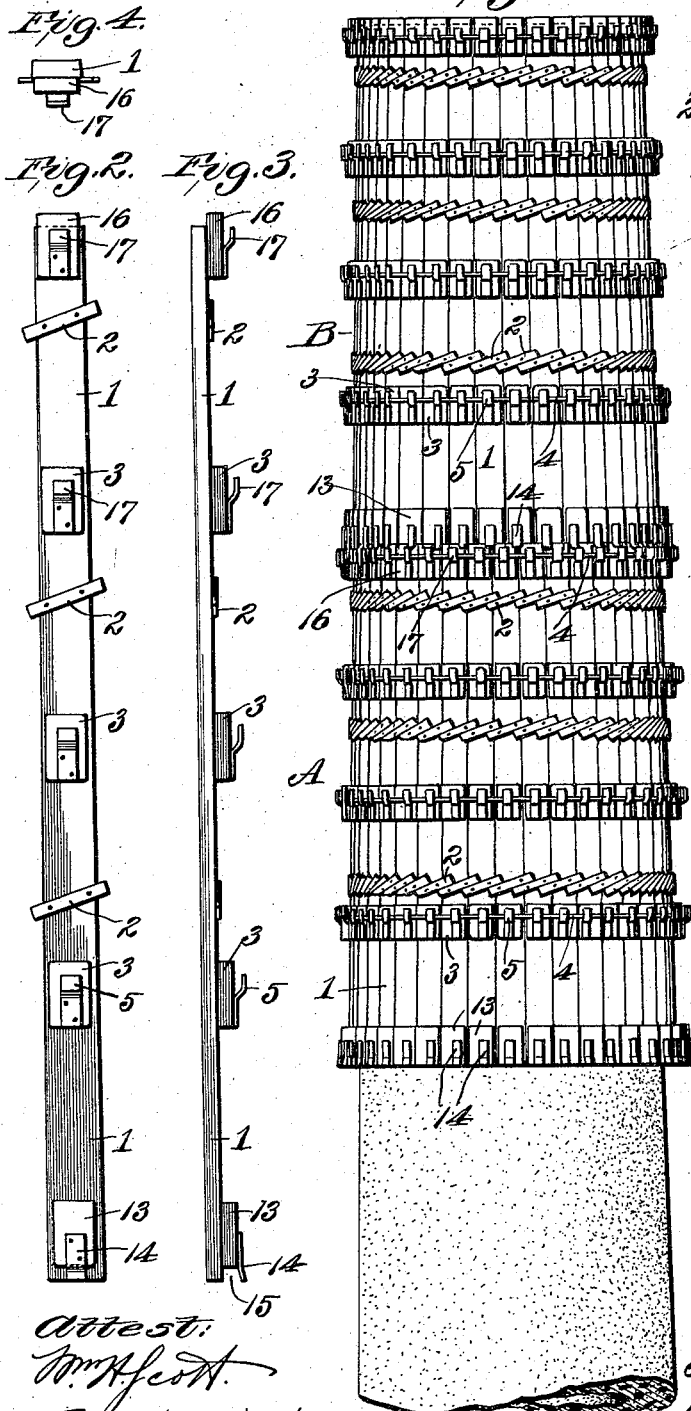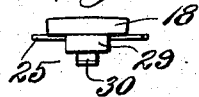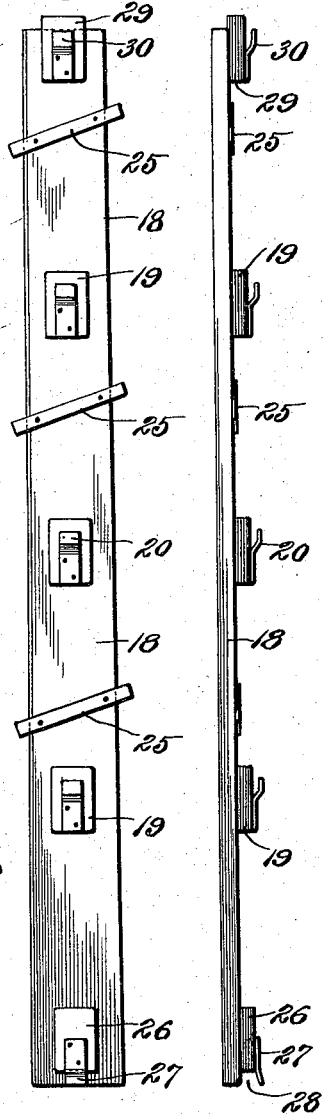

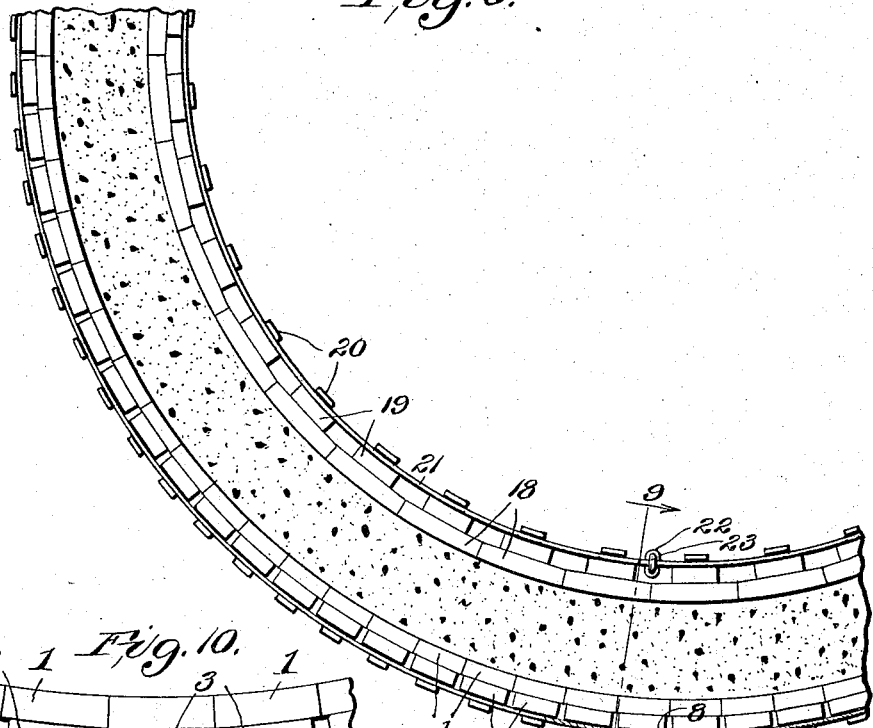

JOHN V. BOLAND, OF ST. LOUIS, MISSOURI.

MOLD.

1,170,732.   Specification of Letters Patent.   Patented Feb. 8, 1916.

Application filed July 6, 1914. Serial No. 849,092.

*To all whom it may concern:*

Be it known that I, JOHN V. BOLAND, a citizen of the United States, residing at the city of St. Louis, State of Missouri, have invented a new and useful Mold, of which the following is a specification.

This invention relates to molds or forms for use in erecting concrete walls and particularly walls of chimneys, silos and other inclosing walls.

An object of the invention is to provide a set of molds for erecting annular walls whose diameter is reduced toward the top, thereby producing a structure which tapers gradually and uniformly toward the upper end.

Each mold includes an outer annular mold and an inner annular mold in coöperative relation, so that the intervening space between the molds defines the thickness of the wall which will be formed by the concrete. The outer mold is composed of numerous duplicate tapering units, all of which are arranged of such dimensions and in such relation to the diameter of the mold that when one of said units is withdrawn and the remaining units are placed edge-to-edge, the larger end of the reduced mold becomes of the same diameter as the smaller end of the mold before the removal of said unit. Suitable clamping or binding devices are utilized so that all of the units may be held together, irrespective of the size of the mold, or the number of units therein. The inner mold is similarly constructed to the extent that it is composed of a number of units adapted to be held together in mold form and of such dimensions that the withdrawal of one unit permits the mold to be reduced so that the larger end of the reduced mold becomes of the same size as the smaller end of the mold before the unit was withdrawn.

Suitable provision is made whereby one mold may be superposed upon and held in proper relation to another mold so that the tapering annular space formed by the set of molds may be filled with concrete to produce a tapering concrete wall.

The invention possesses many other advantageous features. It will be observed that one feature of particular advantage resides in the fact that all of the units of the outer molds are duplicates and all of the units of the inner molds are duplicates, so that it is immaterial which unit be removed in regulating the size of the mold.

In the accompanying drawings, wherein I have illustrated a suitable embodiment of the invention, Figure 1 is an elevation showing a set of molds in actual use in the formation of a concrete structure. Fig. 2 is an outer side elevation of one of the units composing the outer mold. Fig. 3 is a view looking toward the edge of one of the units and illustrating the supports for the bonding devices by which the assembled units are held in place. Fig. 4 is a view showing the upper end of one of the units of the outer mold. Fig. 5 is an inner side elevation of one of the units forming the inner mold. Fig. 6 is a view looking toward the edge of one of the units of the inner mold. Fig. 7 is a view showing the upper end of one of the inner mold units. Fig. 8 is a plan view of a portion of an inner and outer mold, showing the intervening space partially filled with concrete. Fig. 9 is a sectional view on the line 9—9 of Fig. 8, showing the bonding and truing devices for the molds. Fig. 10 is a detailed view of the devices by which the encircling bands or cables of the outer mold are bound or clamped upon the mold. Fig. 11 is a side elevation further illustrating said device. Fig. 12 is a detailed view showing a part of the truing devices for the units of the inner mold.

The outer mold includes a plurality of units 1 adapted to be assembled edge-to-edge, in annular form so that the inner surface of the mold thus formed will define the outer surface of the wall to be produced. The units 1 are duplicate in formation and taper gradually from their lower ends to their upper ends, so that the diameter of the upper end of the annular mold, formed by assembling the units, is somewhat less than the diameter of the lower end of the mold. All of the units are so tapered from their lower to their upper ends that if any one of said units be withdrawn and the mold reduced to place the remaining units edge-to-edge, closing the gap created by the removal of the one unit, the lower or larger end of the reduced mold will be the same in diameter as the smaller end of the mold, before the unit was removed and the mold reduced.

If two outer molds be utilized and one of said molds be superposed upon the other, as illustrated in Fig. 1, the upper mold will include one less unit than does the lower mold. After the wall has been formed within both of said molds, the lower mold A may be removed and superposed upon the upper mold B; and in order to reduce the lower mold, so that the larger and lower end thereof will be of the same diameter as the smaller and upper end of the upper mold, it is necessary to remove two of the units from the lower mold. This is necessary because the removal of only one unit would produce a mold of the same dimensions as the mold B, whereas it is desired to produce a mold whose larger end registers with the smaller end of the mold B.

To each mold unit 1 is secured a number of straps or plates 2. The straps or plates 2 are the same on all of the units and are secured in oblique positions so that when the units are placed edge-to-edge, the lower ends of the plates or straps on one unit extend under the upper ends of the plates or straps on the adjacent unit, and so on throughout the series. The straps or plates on each unit thus engage and constitute a support for the adjacent units, so that said straps retain all of the units annularly alined.

A number of blocks 3 are rigidly secured to the outer surface of each unit. In the embodiment shown there are three of said blocks on each unit and they are arranged so that, when the molds are assembled, there are a number of rows of blocks extending entirely around the mold, as may be readily understood by reference to Fig. 1. Said blocks constitute bearings for the clamping cables 4 which encircle the mold and bind upon said blocks to hold the mold units rigidly in position. A supporting member 5 for the clamping cable is secured to each block 3 and said supporting member is in the form of a metallic plate fastened to the lower portion of the block and having its upper end removed from the block to form a support in which the cable is received, as illustrated in Figs. 10 and 11. Thus, the cables are held in proper position around the mold and against the blocks 3 and will be prevented from displacement by the supporting members 5.

To each of the blocks 3, on one of the units, two plates 6 are rigidly secured. The rod 7 between said two plates constitutes a pivot for holding the end member 8 of the cable. The opposite end of the cable, which encircles the mold, passes through a hole in a revoluble drum 9 supported by the plates 6, so that by revolving the drum to wind the cable thereon said cable will clamp all of the units in their edge-to-edge position and prevent the removal of any of the units. The upper end of each member 9 is extended to provide a portion 10 by which the member 9 may be actuated or revolved to tighten and wind the cable thereon. The member 9 is provided with a ratchet wheel 11 adjacent to one of the plates 6 adapted to be engaged by a pawl 12 by which said parts will be held in whatever position they may be placed.

The lower end of each outer mold unit is provided with a block 13 secured to the unit at a slight distance from the end. A plate 14 is rigid with each block 13 and extends obliquely downwardly and outwardly to form a space 15. The upper end of each unit of the outer mold has secured thereto a block 16 extending beyond the upper end of the unit a distance substantially equal to the distance of the block 13 from the lower end of the unit.

Since all of the units of the sets of outer molds are duplicates, it is apparent that when one mold is assembled and another mold is superposed thereon the blocks 16 on the lower mold will be received in the spaces 15 at the lower end of the upper mold, thereby locking the molds together and holding them concentric with respect to the same vertical axis. The blocks 16 are provided with cable supporting members 17, similar in all respects to the members 5, it being understood that a cable is clamped around the upper end of the mold against the blocks 16 in precisely the same manner as the cables are clamped around the mold against the blocks 3, as previously described. The cable which is clamped around the blocks 16 at the upper end of each mold also holds in position the lower ends of the units of the mold next above, so that at the union or interlocking ends of the superposed mold units one cable clamps and holds in position the upper end of the lower mold and the lower end of the upper mold. Obviously, since the lower ends of the units are wider than are the upper ends, it follows that the units of the two molds superposed one upon the other break joint so that the edges of the upper units do not register with or match the edges of the lower units.

The inner or coöperating mold is composed of units 18 which are duplicate in formation and which taper gradually from their lower ends to their upper ends so that the diameter of the upper end of the inner mold, formed by assembling the units 18, is somewhat less than the diameter of the lower end of said mold. All of the units 18 are so tapered from their lower to their upper ends that if any one of said units be withdrawn and the mold reduced to place the remaining units edge-to-edge, closing the gap created by the removal of one unit, the lower or larger end of the reduced mold will be the same in diameter as the smaller end of the mold before the unit was removed and the mold reduced.

Each of the units 18 supports a series of bearing blocks 19 on its inner side. To each block 19 there is secured a supporting member 20, comprising a metallic plate whose lower end is attached to the block and whose upper end is spaced away from the block forming a space adapted to receive the expanding ring. The units 18 of the inner mold are to be assembled edge-to-edge to form an annular mold which is concentric with the outer annular mold and to provide an intervening space adapted to receive the concrete to form the wall.

The blocks 19 of the several units 18 are in the same horizontal planes and when the units have been assembled an expanding metallic rod or open ring 21 is placed upon each series of supports 20 in the manner illustrated in Fig. 12. The expanding rings 21 are of the resilient open type which must be compressed to enter the molds and which, therefore, impart outward pressure against all of the blocks 19 and thereby assist in holding the various units in proper position. The ends of each rod or open ring 21 overlap, as illustrated in Fig. 12, and the overlapping portions are held together by a suitable device provided for that purpose. The form of said device which I have illustrated includes a body 22 having a notch in its upper end of sufficient size to receive the overlapping portions of a ring or rod 21. A U-shaped member 23 embraces the overlapping portions of the ring or rod 21, between the two arms thereof, and extends through the body 22 and is provided with clamping nuts 24 whereby said member may be clamped upon the overlapping portions to hold the expanding ring or rod in annular form. It will be understood that an expanding ring or rod of this construction is mounted upon each annular series of supports 20 so that outward pressure is imparted to all parts of the various units comprising the inner mold.

To each of the units 18 is secured a number of straps or plates 25. The straps or plates 25 are the same on all of the units 18 and are secured in oblique position so that when the units are placed edge-to-edge the lower ends of the plates or straps on one unit extend under the upper ends of the plates or straps on the adjacent unit, and so on throughout the series. The straps or plates on each unit thus engage and constitute a support for the adjacent units so that said straps coöperating with the expanding rings or rods 21 retain all of the units annularly alined. The lower end of each mold unit 18 is provided with a block 26 secured to the unit at slight distances from the end. A plate 27 is rigid with each block 26 and extends obliquely downwardly and outwardly to form a space 28. The upper end of each unit of the inner mold has secured thereto a block 29 extending beyond the upper end of the unit a distance substantially equal to the distance of the block 26 from the lower end of the unit.

Since all of the units of the sets of inner molds are duplicates, it will be understood that when one mold is assembled and another mold is superposed thereon, the blocks 29 on the lower mold will be received within the spaces 28 at the lower end of the upper mold. In this manner the abutting ends of the superposed molds are locked together concentrically with respect to the same vertical axis. The blocks 29 are provided with supports 30, similar to the supports 20, and said supports 30 receive an expanding ring or rod 21 as do the supports 20 so that one expanding ring or rod, at the abutting ends of the superposed molds, imparts the desired outward pressure to said abutting ends.

As illustrated in Fig. 4, the inner surfaces of the outer mold units are slightly grooved so that, when the mold is formed, the inner surfaces of all the units will be in substantial annular alinement. By reference to Fig. 7, it will be noted that the outer surfaces of the inner mold units are slightly arched outwardly so that, when all of the inner mold units are assembled, their outer surfaces will be substantially in annular alinement, thus conforming to the desired formation of the inner surface of the wall to be formed with the molds.

What I claim and desire to secure by Letters Patent is:—

1. A mold made up of a series of uniform and tapering units, adapted for assembling to provide through such tapering formation a mold of tapering form, the upper or lower end of any one unit forming an equal length in the circumferential length of the mold as the similar end of any other unit, the length ratio of the respective ends of any one unit being such that in the absence of such unit from a particular mold, the maximum sectional dimension of such latter mold will equal the minimum sectional dimension of the mold including such unit.

2. A mold made up of a series of uniform and tapering units, adapted for assembling to provide through such tapering formation a mold of tapering form, the upper or lower end of any one unit forming an equal length in the circumferential length of the mold as the similar end of any other unit, the length ratio of the respective ends of any one unit being such that in the absence of such unit from a particular mold, the maximum sectional dimension of such mold will equal the minimum sectional dimension of the mold including such unit, and means for securing the unit in mold forming relation.

3. A mold made up of a series of uniform and tapering units, adapted for assembling to provide through such tapering formation a mold of tapering form, the upper or lower end of any one unit forming an equal length in the circumferential length of the mold as the similar end of any other unit, the length ratio of the respective ends of any one unit being such that in the absence of such unit from a particular mold, the maximum sectional dimension of such latter mold will equal the minimum sectional dimension of the mold including such unit, a strip carried by each unit and projected beyond the side edges thereof, the strip of one unit overlying and underlying the strips of the immediately adjacent oppositely disposed units.

In witness whereof, I have signed this specification in the presence of two subscribing witnesses.

JOHN V. BOLAND.

Witnesses:
 JOHN D. RIPPEY,
 L. C. KINGSLAND.

Copies of this patent may be obtained for five cents each, by addressing the "Commissioner of Patents, Washington, D. C."